US007860085B2

(12) United States Patent
Garbanati et al.

(10) Patent No.: US 7,860,085 B2
(45) Date of Patent: Dec. 28, 2010

(54) DUAL OSS MANAGEMENT OF AN ETHERNET ACCESS NETWORK

(75) Inventors: Linda F. Garbanati, San Ramon, CA (US); Ralph Ballart, San Ramon, CA (US)

(73) Assignee: Alcatel Lucent, Paris (FR)

( * ) Notice: Subject to any disclaimer, the term of this patent is extended or adjusted under 35 U.S.C. 154(b) by 368 days.

(21) Appl. No.: 11/748,358

(22) Filed: May 14, 2007

(65) Prior Publication Data

US 2008/0285550 A1 Nov. 20, 2008

(51) Int. Cl.
H04J 3/07 (2006.01)
(52) U.S. Cl. ...................... 370/354; 370/353
(58) Field of Classification Search ............... 370/353, 370/354
See application file for complete search history.

(56) References Cited

U.S. PATENT DOCUMENTS

| | | | | |
|---|---|---|---|---|
| 6,266,341 | B1 * | 7/2001 | Surprenant et al. | 370/458 |
| 6,674,750 | B1 * | 1/2004 | Castellano | 370/354 |
| 6,718,139 | B1 * | 4/2004 | Finan et al. | 398/59 |
| 6,963,561 | B1 * | 11/2005 | Lahat | 370/356 |
| 7,440,408 | B1 * | 10/2008 | Anderson | 370/252 |
| 7,447,228 | B1 * | 11/2008 | Algie | 370/433 |
| 7,599,373 | B1 * | 10/2009 | Kalmanek et al. | 370/395.1 |
| 7,675,945 | B2 * | 3/2010 | Fourcand | 370/503 |
| 2003/0152075 | A1 * | 8/2003 | Hawthorne et al. | 370/389 |
| 2004/0190504 | A1 * | 9/2004 | Bansal | 370/379 |
| 2005/0238049 | A1 * | 10/2005 | Delregno | 370/466 |
| 2006/0023750 | A1 * | 2/2006 | Kim et al. | 370/473 |
| 2006/0095920 | A1 * | 5/2006 | Goossens | 719/313 |
| 2007/0064731 | A1 * | 3/2007 | Mizutani et al. | 370/468 |

OTHER PUBLICATIONS

Mazzini et al., "OSS Integration: Multi-Vendor, Multi-Technology EMS-NMS Interface: Oss interfaces for efficiently integrating transport and data services into the OSS infrastructure is key to future network profitability," Alcatel Telecommunications Review, Jul. 2003, pp. 231-241, Alcatel, Paris Cedex, France.

Pelosi, Steve, "Network Management Systems for Overseas Solution," Jujitsu Science Technical Journal, Oct. 2006, pp. 476-482, vol. 42, issue 4.

"Circuit Emulation Service Definitions, Framework and Requirements in Metro Ethernet Networks," Metro Ethernet Forum Technical Specification, Apr. 2004, pp. 1-65, No. MEF3.

Tanaka et al., "A Development of Circuit Emulation System on TDM Over Ethernet Comprising OAM and Protection Function," IEICE Transactions on Communications Society, Communication Society, Mar. 2006, pp. 668-674, Tokyo, Japan.

* cited by examiner

*Primary Examiner*—Daniel J Ryman
*Assistant Examiner*—Jay P Patel
(74) *Attorney, Agent, or Firm*—Duft Bornsen & Fishman LLP

(57) ABSTRACT

Management of Ethernet access networks that provide both TDM services and packet services is disclosed. An Ethernet access network as described herein includes a head end having TDM network interface ports and packet network interface ports, customer location equipment (CLE) having TDM service interface ports and packet service interface ports, and a connection medium connecting the head end and the customer location equipment. To provide management of the network, a relationship is defined between TDM network interface ports of the head end and TDM service interface ports of the CLE. The defined relationship between the TDM network interface ports and the TDM service interface ports is modeled as a cross connect system. A TDM OSS may then manage the TDM services of the Ethernet access network by managing the cross connect system, and a packet OSS may manage the packet services of the Ethernet access network.

20 Claims, 6 Drawing Sheets

DUAL OSS MANAGEMENT OF AN ETHERNET ACCESS NETWORK

BACKGROUND OF THE INVENTION

1. Field of the Invention

The invention is related to the field of communication networks and, in particular, to the management of an Ethernet access network. More particularly, for an Ethernet access network providing both TDM services and packet services, one set of Operations Support Systems (OSSs) is used to manage the TDM services in the Ethernet access network and another set is used to manage the packet services in the Ethernet access network.

2. Statement of the Problem

An access network is the part of a communication network that connects a customer to a central office of their network provider. A business customer typically has customer location equipment (CLE) at one edge of the access network. The central office includes a network element at the other edge of the access network that connects to a core network. The network element (also referred to as the head end or head end equipment) may comprise a switch, a digital cross-connect, an add-drop multiplexer for a SONET network, an Ethernet switch/router, etc. A connection medium connects the network element in the central office to the CLE. The connection medium may be copper wires, optical fiber, or another type of medium.

Network operators provide many types of network management when operating a communication network. Network management is the execution of a set of functions for controlling, planning, allocating, deploying, coordinating, and monitoring the resources of a communication network. These operational functions are supported by systems normally referred to as Operations Support Systems (OSS). An OSS supports processes such as maintaining network inventory, provisioning services, configuring network components, and managing faults.

In an access network that provides Time Division Multiplexing (TDM) services, network management is provided through an Element Management System (EMS) and OSSs. The EMS connects to the head end of the access network and receives management data from the head end. The EMS also connects to the OSSs and transmits the management data to each OSS so that the OSS can provide network management. The interface between the head end and the EMS and between the EMS and the OSS is typically a Transaction Language 1 (TL1) interface for TDM services management.

Another type of access network gaining popularity is an Ethernet access network that provides packet services (or packet-based services). The head end of an Ethernet access network includes an Ethernet switch/router that provides the packet services to customers. Network management for an Ethernet access network is provided through an EMS and different OSSs. The EMS connects to the head end of the Ethernet access network and receives management data from the head end. The EMS also connects to the OSSs and transmits the management data to the OSS so that the OSS can provide network management.

In addition to packet services, an Ethernet access network is able to provide TDM services. An Ethernet switch/router may include network interface TDM ports and packet ports to provide both TDM services and packet services. One problem however is that present OSSs that manage Ethernet access networks are not able to manage the TDM services that may be provided through an Ethernet access network. Network operators could program the OSSs to manage the TDM services within an Ethernet access network, but at a significant cost and expenditure of time. Another solution for managing both the TDM services and the packet services of an Ethernet access network is desired.

SUMMARY OF THE SOLUTION

Embodiments of the invention solve the above and other related problems by managing both TDM services and packet services in an Ethernet access network with multiple OSS suites. A TDM OSS may be used to manage the TDM services in the Ethernet access network, such as a legacy OSS that is used to manage a TDM access network. A packet OSS may be used to manage the packet services in the Ethernet access network, such as a next generation OSS that is used to manage an Ethernet access network. A network operator may advantageously be able to operate the Ethernet access network having the TDM services and the packet services using existing OSS facilities.

One embodiment of the invention comprises a method of managing an Ethernet access network providing both TDM services and packet services. The Ethernet access network includes a head end having a plurality of TDM network interface ports and a plurality of packet network interface ports, customer location equipment (CLE) having a plurality of TDM service interface ports and a plurality of packet service interface ports, and a connection medium between the head end and the customer location equipment. According to the method, a relationship is defined between the TDM network interface ports of the head end and the TDM service interface ports of the CLE. The defined relationship between the TDM network interface ports and the TDM service interface ports is then modeled as a cross connect system. A TDM OSS may then manage the TDM services of the Ethernet access network by managing the cross connect system, and a packet OSS may manage the packet services of the Ethernet access network.

This method advantageously allows a network operator to manage both the TDM services and packet services of an Ethernet access network using multiple OSSs. The TDM OSS manages the TDM services through modeling of the services as a cross connect system. Network operators may advantageously use legacy OSSs, which are traditionally used to manage a TDM access network, as the TDM OSS. Network operators may also advantageously use next generation OSSs, which are used to manage an Ethernet access network, as the packet OSS. The network operators thus do not need to spend the time and expense to program new, dual purpose OSSs that can simultaneously manage both the TDM services and the packet services, as existing OSS facilities may be used.

The invention may include other exemplary embodiments described below.

DESCRIPTION OF THE DRAWINGS

The same reference number represents the same element or same type of element on all drawings.

DETAILED DESCRIPTION OF THE INVENTION

FIGS. 1-6 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
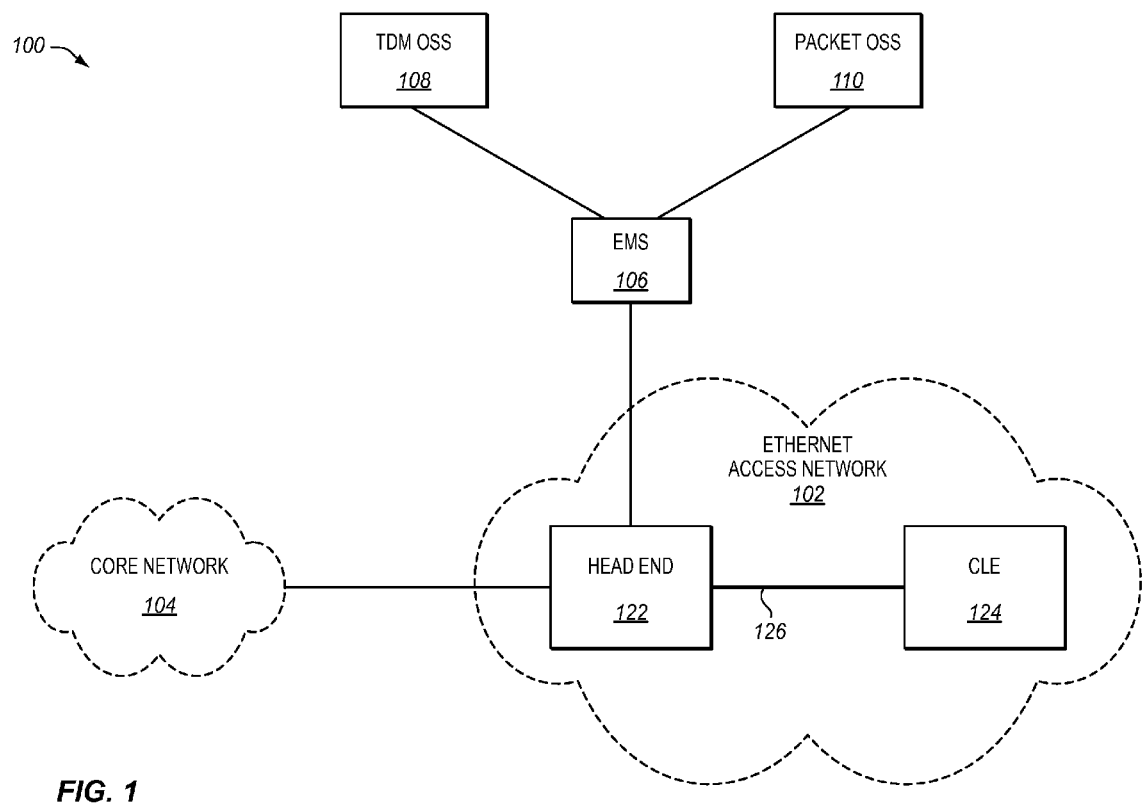
FIG. 1 illustrates a communication network in an exemplary embodiment of the invention.

FIG. 1 illustrates a communication network 100 in an exemplary embodiment of the invention. Communication network 100 includes an Ethernet access network 102, a core network 104, an Element Management System (EMS) 106, a TDM Operations Support System (OSS) 108, and a packet OSS 110. Ethernet access network 102 (also referred to as an Ethernet edge network) comprises any network adapted to provide TDM services and packet services to customers through Ethernet technologies. Ethernet access network 102 may include access links with Ethernet layer 2 networking to provide circuit emulation of TDM services and packet services. The transport layer of Ethernet access network 102 may also include IP, MPLS, or another type of higher layer protocol transport layer. The transport layer of Ethernet may be supported by a variety of physical media and physical layer protocols including point-to-point fiber links, point-to-multi-point fiber-optic networks, GPON, EPON, G-EPON, etc. Core network 104 is the network that forms the backbone or a portion of the backbone for a carrier network. EMS 106 comprises any systems, servers, or other facilities adapted to manage a network element, such as a head end in an access network. One example of EMS 106 is a 5620 EMS manufactured by Alcatel. TDM OSS 108 comprises any systems, servers, or other facilities adapted to manage TDM services in an access network. Packet OSS 110 comprises any systems, servers, or other facilities adapted to manage packet services in an access network.

Ethernet access network 102 includes a head end 122 and customer location equipment (CLE) 124 connected by a connection medium 126. Head end 122 comprises any switch, router, or other system at the edge of Ethernet access network 102 that is adapted to interface CLE 124 with core network 104. One example of head end 122 is a 7710 Ethernet switch manufactured by Alcatel. CLE 124 comprises any systems, terminals, or other equipment adapted to provide a demarcation point at customer locations. One example of CLE 124 is 7250 service access equipment provided by Alcatel. Connection medium 126 comprises any medium or media adapted to connect head end 122 to CLE 124, such as copper wires, an optical fiber, etc.

Figure 2:
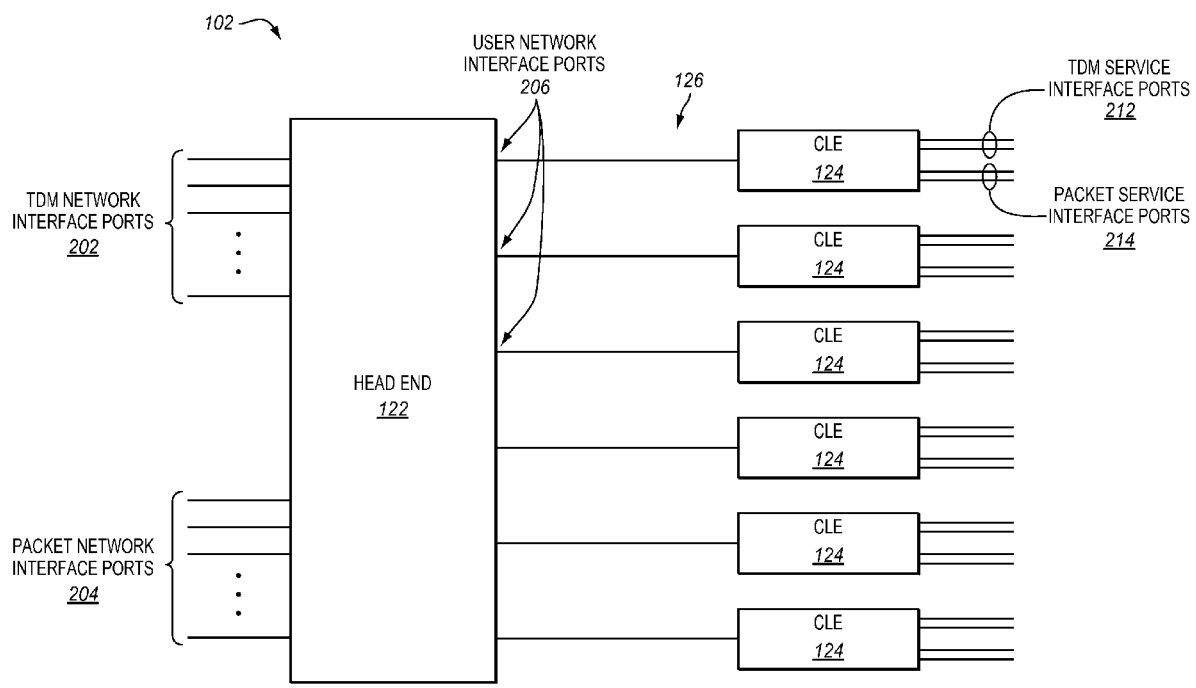
FIG. 2 illustrates an Ethernet access network in an exemplary embodiment of the invention.

FIG. 2 illustrates Ethernet access network 102 in an exemplary embodiment of the invention. This figure illustrates the ports of the equipment in Ethernet access network 102. This is just an exemplary illustration of one possible embodiment, as other port configurations may be used. In this embodiment, head end 122 includes TDM network interface ports 202, packet network interface ports 204, and user network interface ports 206. TDM network interface ports 202 and packet network interface ports 204 comprise any ports adapted to connect head end 122 to core network 104 (not shown in FIG. 2), such as TDM Network to Network Interface (NNI) ports. User network interface ports 206 comprise any ports adapted to connect head end 122 to connection medium 126, such as TDM User Network Interface (UNI) ports. CLE 124 includes TDM service interface ports 212 that are adapted to provide TDM-based connections to a customer, and includes packet service interface ports 214 that are adapted to provide packet-based connections to a customer.

Figure 3:
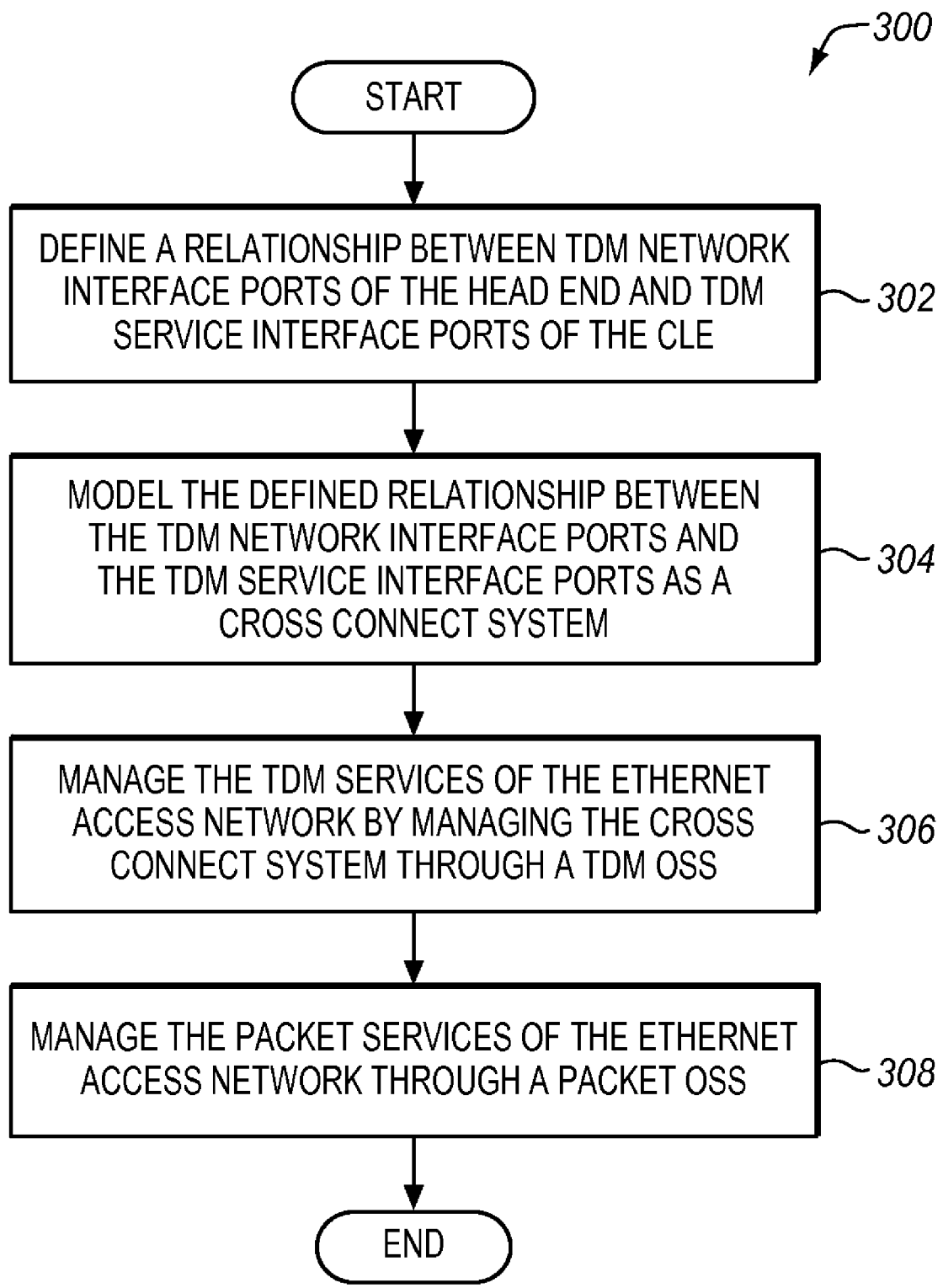
FIG. 3 is a flow chart illustrating a method of managing an Ethernet access network in an exemplary embodiment of the invention.

FIG. 3 is a flow chart illustrating a method 300 of managing an Ethernet access network in an exemplary embodiment of the invention. The steps of method 300 will be described with reference to communication network 100 in FIG. 1 and Ethernet access network 102 in FIG. 2. The steps of the flow chart in FIG. 3 are not all inclusive and may include other steps not shown.

Figure 4:
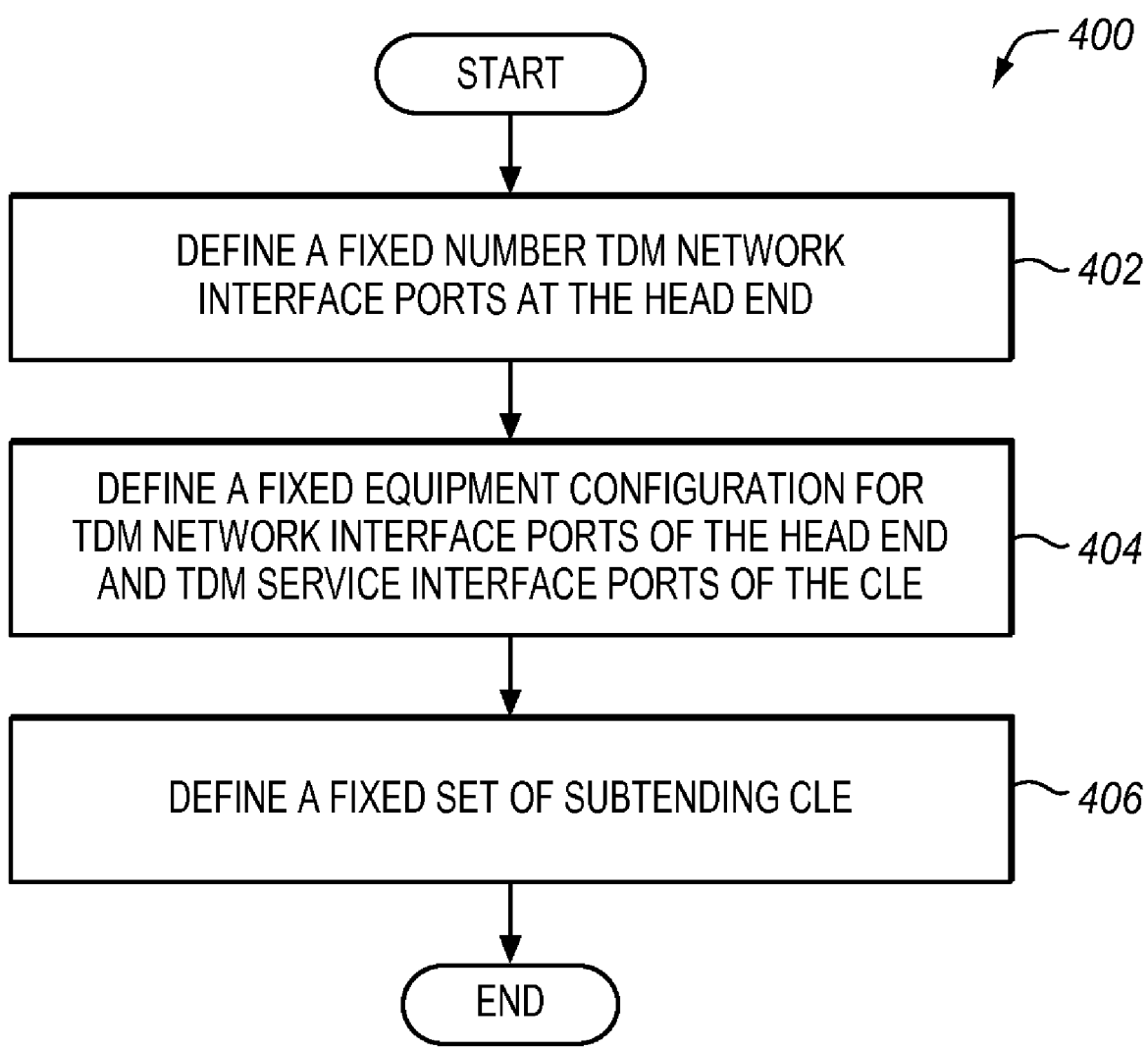
FIG. 4 is a flow chart illustrating a method of defining a relationship between TDM network interface ports of a head end and TDM service interface ports of customer location equipment an exemplary embodiment of the invention.

Step 302 of method 300 includes defining a relationship between TDM network interface ports 202 of head end 122 and TDM service interface ports 212 of CLE 124. This step of method 300 may be performed by EMS 106, a network operator, or a combination of the two. TDM network interface ports 202 of head end 122 and TDM service interface ports 212 may be of the same type, such as all based on T1 or T3, but may be different types, such as ports 202 based on SONET OC-3 and ports 212 based on T1. The relationship between TDM network interface ports 202 and TDM service interface ports 212 is to provide a fixed mapping between the TDM ports. FIG. 4 is a flow chart illustrating a method 400 of defining the relationship between the TDM network interface ports 202 of head end 122 and TDM service interface ports 212 of CLE 124 in an exemplary embodiment of the invention. Step 402 includes defining a fixed number of TDM network interface ports 202 at head end 122. Step 404 includes defining a fixed equipment configuration for TDM network interface ports 202 of head end 122 and TDM service interface ports 212. As an example, the network operator or EMS 106 (see FIG. 1) may pre-provision the equipment slots in head end 122 and CLE 124 so that there is a fixed configuration when head end 122 and CLE 124 are installed. If equipment slots are used for erroneous plug-in units or if head end 122 and CLE 124 are otherwise connected contrary to the fixed equipment configuration, then EMS 106 may generate an alarm. This assures that head end 122 and CLE 124 are configured according to the pre-provisioned configuration. Step 406 of method 400 includes defining a fixed set of subtending CLE 124 as well as a fixed configuration for TDM service interfaces.

Figure 5:
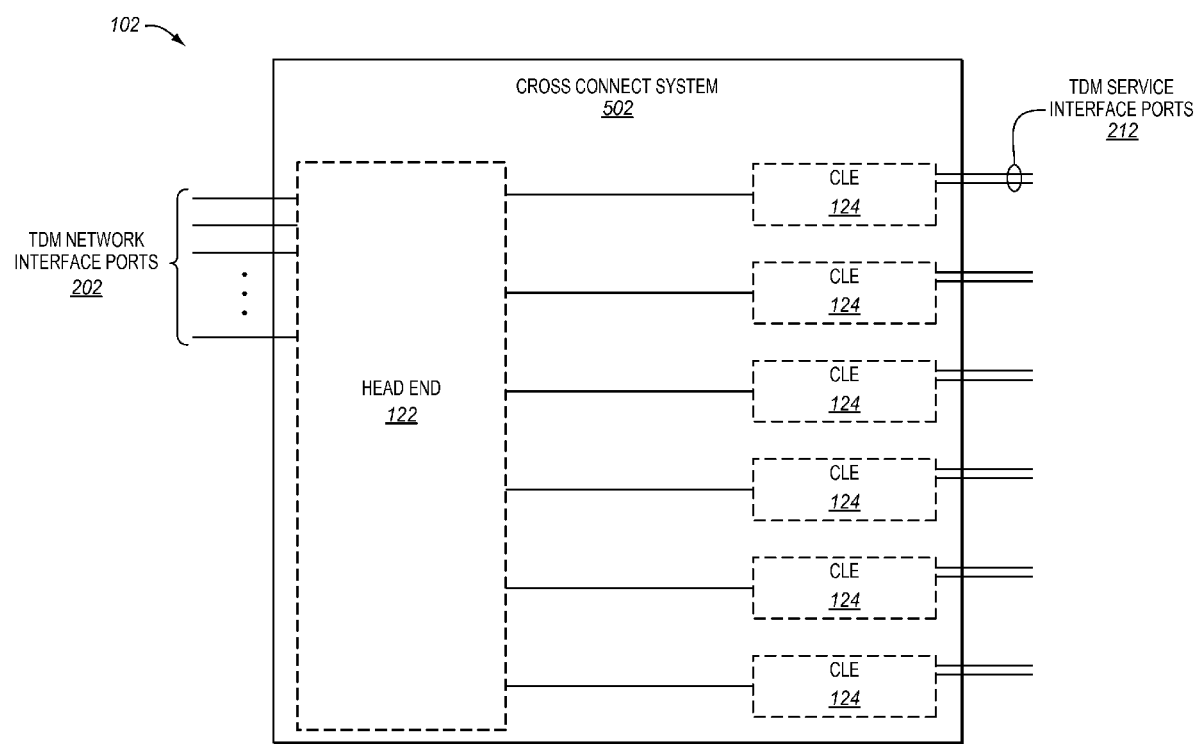
FIG. 5 illustrates a TDM portion of an Ethernet access network modeled as a cross connect system in an exemplary embodiment of the invention.

Step 304 in FIG. 3 includes modeling the defined relationship between TDM network interface ports 202 and TDM service interface ports 212 as a cross connect system. This step of method 300 may be performed by EMS 106, a network operator, or a combination of the two. TDM OSS 108 is adapted to manage TDM-type components, such as a digital cross connect. Thus, in order to allow TDM OSS 108 to manage the TDM services in Ethernet access network 102, the TDM portion of Ethernet access network 102 is modeled as a cross connect system. FIG. 5 illustrates the TDM portion of Ethernet access network 102 modeled as a cross connect system 502 in an exemplary embodiment of the invention. TDM network interface ports 202 of head end 122 represent one end of cross connect system 502, and TDM service interface ports 212 of CLE 124 represent the other end of cross connect system 502.

Step 306 of FIG. 3 includes managing the TDM services of Ethernet access network 102 by managing cross connect system 502 through TDM OSS 108. In order to manage the cross connect system 502, EMS 106 receives management instructions from the TDM OSS 108 that are subsequently carried out on Ethernet access network 102. EMS 106 also forwards alarm notifications to TDM OSS 108. TDM OSS 108 may then manage the TDM services of Ethernet access network 102, such as in a similar way to managing a digital cross connect in a legacy TDM access network.

Step 308 of FIG. 3 includes managing the packet services of Ethernet access network 102 through packet OSS 110. In order to manage the packet services, EMS 106 collects management data from head end 122. EMS 106 then forwards the management data to packet OSS 110. Packet OSS 110 may then manage the packet services of Ethernet access network 102, such as in a similar way to managing an Ethernet switch.

Figure 6:
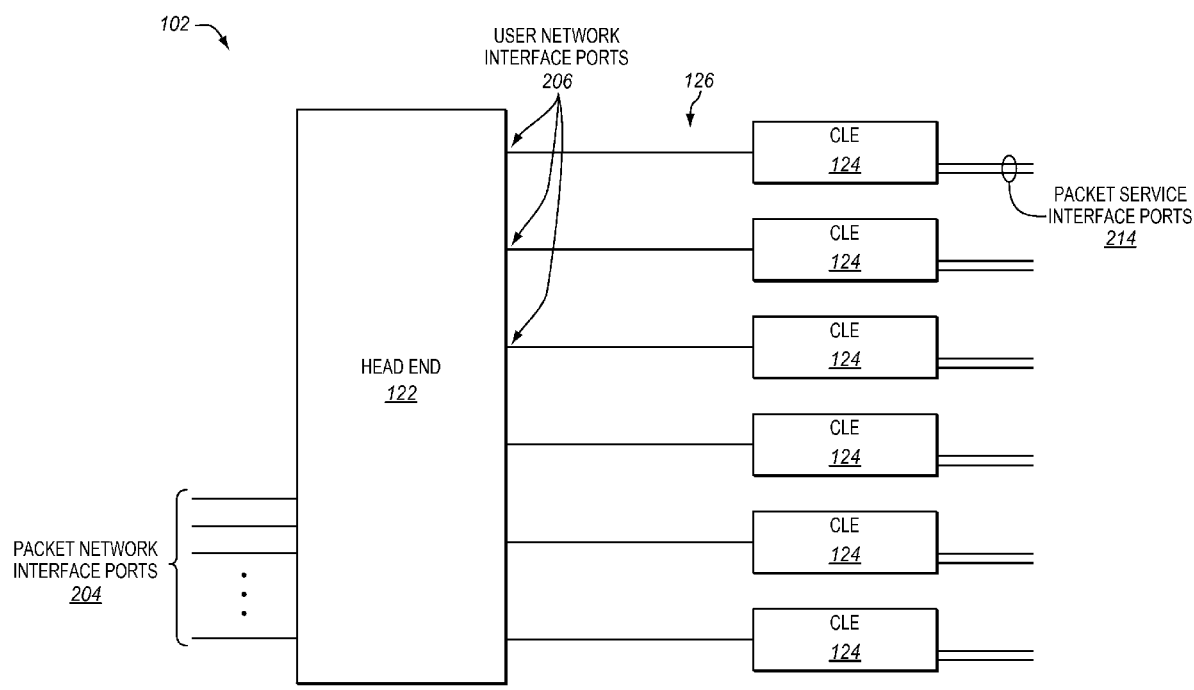
FIG. 6 illustrates an equipment model for a packet portion of an Ethernet access network in an exemplary embodiment of the invention.

FIG. 6 illustrates an equipment model for the packet portion of Ethernet access network 102 in an exemplary embodiment of the invention. As TDM OSS 108 manages the TDM services of Ethernet access network 102 through the cross connect modeling, the remaining packet ports (i.e., Ethernet Layer 2) and full Ethernet access network modeling is managed by packet OSS 110. Because TDM port-based replaceable units have been pre-provisioned to allocate a portion of the bandwidth of Ethernet access network 102 for TDM services, packet OSS 110 is prevented from erroneous use of TDM slots or ports through EMS 106. Additionally, the remaining bandwidth of head end 122 (the total bandwidth of Ethernet access network 102 minus the bandwidth allocated for the TDM services) is used by packet OSS 110 to characterize the total system forwarding capacity. Head end 122 is designed with forwarding capacity that is sufficient to handle the remaining Ethernet ports. Detailed management aspects of Ethernet access network 102 are supported by packet OSS 110 while breaks in physical connectivity with the ODN are available to either or both TDM OSS 108 and packet OSS 110 alarm surveillance systems depending on carrier preference through alarm forwarding filters of EMS 106.

Method 300 in FIG. 3 advantageously allows a network operator to manage both the TDM services and packet services of an Ethernet access network using multiple OSSs. TDM OSS 108 manages the TDM services through modeling of the services as a cross connect system. Network operators may advantageously use legacy OSSs, which are traditionally used to manage a TDM access network, as TDM OSS 108. Network operators may also advantageously use next generation OSSs, which are used to manage an Ethernet access network, as packet OSS 110. The network operators thus do not need to spend the time and expense to program new, dual purpose OSSs that can simultaneously manage both the TDM services and the packet services, as existing OSS facilities may be used.

The following describes one particular manner of modeling the TDM portion of Ethernet access network 102 as a cross connect system. The endpoints of a T1 or T3 circuit carried through Circuit Emulation Services (CES) protocols are uniquely identified in the following way through concatenation indicated by the hyphen sign. A TDM network interface port 202 may be identified as: full distinguished name of head end 122—equipment holder number of slot for primary TDM network interface port (if minislot present, then this indication is iterated twice)—"P" with port number of primary TDM network interface port—time slot number of circuit. A TDM service interface port 212 may be identified as: full distinguished name of head end 122—equipment holder number of slot for primary TDM user interface port (if minislot present, then this indication is iterated twice)—"P" with port number of primary TDM user interface port—(if a splitter is present, then splitter distribution port number is present)—"C"—(slot number of TDM network interface port if present)—"P" with port number of service interface—time slot number of circuit (if service interface is multiplexed payload). CLE 124 may be identified also through concatenation as indicated: full distinguished name of head end 122—equipment holder number of slot for primary TDM user interface port (if minislot present, then this indication is iterated twice)—"P" with port number of primary TDM user interface port—(if a splitter is present, then splitter distribution port number is present)—"C".

Such identification is normally within the character count limitations of memory administration identifiers for legacy OSSs. The resulting cross connect system model with TDM circuit endpoint identifiers represents a type of equipment easily managed by legacy inventory and assignment systems, alarm surveillance systems, and TDM service provisioning systems.

In FIG. 1, to allow EMS 106 to transmit management data to TDM OSS 108, EMS 106 may be equipped with a Transaction Language-1 (TL1) interface. The TL1 interface is adapted to transmit TL1 messages to the TDM OSS 108 to allow TDM OSS 108 to manage the TDM services of Ethernet access network 102. The TL1 interface orchestrates normal API mechanisms of an EMS 106 North-bound Interface (NBI) to support end-to-end TDM circuit provisioning used in TDM OSS service provisioning. Additionally, the TL1 interface supports publication and retrieval of alarm notifications of interest to TDM OSS 108, thus utilizing typical alarm notification filtering capabilities available on EMS 106. Packet OSS 110 manages the remaining Ethernet access network 102 aspects through normal EMS NBI mechanisms.

Although specific embodiments were described herein, the scope of the invention is not limited to those specific embodiments. The scope of the invention is defined by the following claims and any equivalents thereof.

We claim:

1. A method of managing an Ethernet access network comprising a head end and customer location equipment, wherein the Ethernet access network is adapted to provide TDM services and packet services, the method comprising:

defining a relationship between TDM network interface ports of the head end and TDM service interface ports of the customer location equipment;

modeling the defined relationship between the TDM network interface ports and the TDM service interface ports as a cross connect system;

managing the TDM services of the Ethernet access network by managing the cross connect system through a TDM operations support system (OSS); and managing the packet services of the Ethernet access network through a packet OSS;

wherein the head end located at a central office of a network provider is in communication with the customer location equipment located at a customer location over the Ethernet access network;

wherein each of the TDM OSS and the packet OSS comprises a system operating outside of the head end and outside of the customer location equipment; and wherein the TDM OSS is different from the packet OSS.

2. The method of claim 1 wherein defining a relationship between TDM network interface ports of the head end and TDM service interface ports of the customer location equipment comprises:

defining a fixed number of the TDM network interface ports at the head end;
defining a fixed equipment configuration for the TDM network interface ports of the head end and the TDM service interface ports of the customer location equipment; and
defining a fixed set of subtending customer location equipment.

3. The method of claim 2 wherein defining a fixed equipment configuration for the TDM network interface ports of the head end and the TDM service interface ports of the customer location equipment comprises:
pre-provisioning TDM equipment slots in the head end and the customer location equipment.

4. The method of claim 2 further comprising:
generating an alarm if the head end and the customer location equipment are connected contrary to the fixed equipment configuration.

5. The method of claim 1 wherein managing the TDM services of the Ethernet access network comprises:
managing a first bandwidth of the Ethernet access network allocated to the TDM services.

6. The method of claim 5 wherein managing the packet services of the Ethernet access network comprises:
managing a second bandwidth of the Ethernet access network allocated to the packet services, wherein the second bandwidth comprises the total bandwidth of the Ethernet access network minus the first bandwidth allocated to the TDM services.

7. A system for managing an Ethernet access network adapted to provide TDM services and packet services, wherein the Ethernet access network includes a head end having a plurality of TDM network interface ports and a plurality of packet network interface ports, customer location equipment having a plurality of TDM service interface ports and a plurality of packet service interface ports, and a connection medium connecting the head end and the customer location equipment, the system comprising:
an element management system connected to the head end and adapted to define a relationship between the TDM network interface ports at the head end and the TDM service interface ports at the customer location equipment, and to model the defined relationship between the TDM network interface ports and the TDM service interface ports as a cross connect system;
a TDM operations support system (OSS) adapted to manage the TDM services of the Ethernet access network by managing the cross connect system as modeled by the element management system; and
a packet OSS adapted to manage the packet services of the Ethernet access network;
wherein the head end located at a central office of a network provider is in communication with the customer location equipment located at a customer location over the Ethernet access network;
wherein each of the TDM OSS and the packet OSS comprises a system operating outside of the head end and outside of the customer location equipment; and
wherein the TDM OSS is different from the packet OSS.

8. The system of claim 7 wherein the element management system is further adapted to:
define a fixed number of the TDM network interface ports at the head end;
define a fixed equipment configuration for the TDM network interface ports of the head end and the TDM service interface ports of the customer location equipment; and
define a fixed set of subtending customer location equipment.

9. The system of claim 8 wherein the element management system is further adapted to:
pre-provision TDM equipment slots in the head end and the customer location equipment.

10. The system of claim 8 wherein the element management system is further adapted to:
generate an alarm if the head end and the customer location equipment are connected contrary to the fixed equipment configuration.

11. The system of claim 7 wherein the TDM OSS is further adapted to:
manage a first bandwidth of the Ethernet access network allocated to the TDM services.

12. The system of claim 11 wherein the packet OSS is further adapted to:
manage a second bandwidth of the Ethernet access network allocated to the packet services, wherein the second bandwidth comprises the total bandwidth of the Ethernet access network minus the first bandwidth allocated to the TDM services.

13. The system of claim 7 wherein the element management system includes a Transaction Language-1 (TL1) interface adapted to transmit TL1 messages to the TDM OSS to allow the TDM OSS to manage the TDM services of the Ethernet access network.

14. A communication network, comprising:
an Ethernet access network adapted to provide TDM services and packet services, the Ethernet access network comprising:
a head end having a plurality of TDM network interface ports and a plurality of packet network interface ports;
customer location equipment having a plurality of TDM service interface ports and a plurality of packet service interface ports; and
a connection medium connecting the head end and the customer location equipment;
an element management system connected to the head end and adapted to define a relationship between the TDM network interface ports of the head end and the TDM service interface ports of the customer location equipment, and to model the defined relationship between the TDM network interface ports and the TDM service interface ports as a cross connect system;
a first operations support system (OSS) adapted to manage the TDM services of the Ethernet access network by managing the cross connect system as modeled by the element management system; and
a second OSS adapted to manage the packet services of the Ethernet access network;
wherein the head end located at a central office of a network provider is in communication with the customer location equipment located at a customer location over the Ethernet access network;
wherein each of the TDM OSS and the packet OSS comprises a system operating outside of the head end and outside of the customer location equipment; and
wherein the TDM OSS is different from the packet OSS.

15. The communication network of claim 14 wherein the element management system is further adapted to:
- define a fixed number of the TDM network interface ports at the head end;
- define a fixed equipment configuration for the TDM network interface ports of the head end and the TDM service interface ports of the customer location equipment; and
- define a fixed set of subtending customer location equipment.

16. The communication network of claim 15 wherein the element management system is further adapted to:
- pre-provision equipment slots in the head end and the customer location equipment.

17. The communication network of claim 16 wherein the element management system is further adapted to:
- generate an alarm if the head end and the customer location equipment are connected contrary to the fixed equipment configuration.

18. The communication network of claim 14 wherein the head end comprises an Ethernet switch.

19. The communication network of claim 14 wherein:
- the first OSS is further adapted to manage a first bandwidth of the Ethernet access network allocated to the TDM services; and
- the second OSS is further adapted to manage a second bandwidth of the Ethernet access network allocated to the packet services, wherein the second bandwidth comprises the total bandwidth of the Ethernet access network minus the first bandwidth allocated to the TDM services.

20. The communication network of claim 14 wherein the element management system includes a Transaction Language-1 (TL1) interface adapted to transmit TL1 messages to the first OSS to allow the first OSS to manage the TDM services of the Ethernet access network.

* * * * *